B. J. HUBBARD.
WINDSHIELD WING.
APPLICATION FILED FEB. 14, 1920.
1,380,909. Patented June 7, 1921.
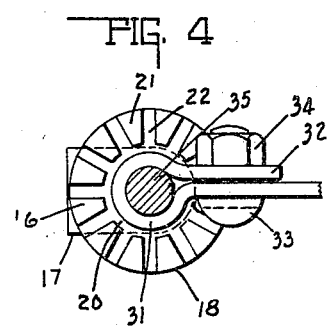
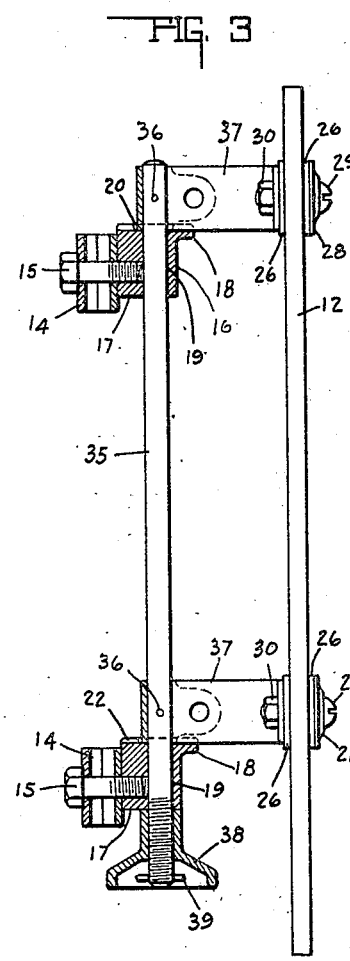
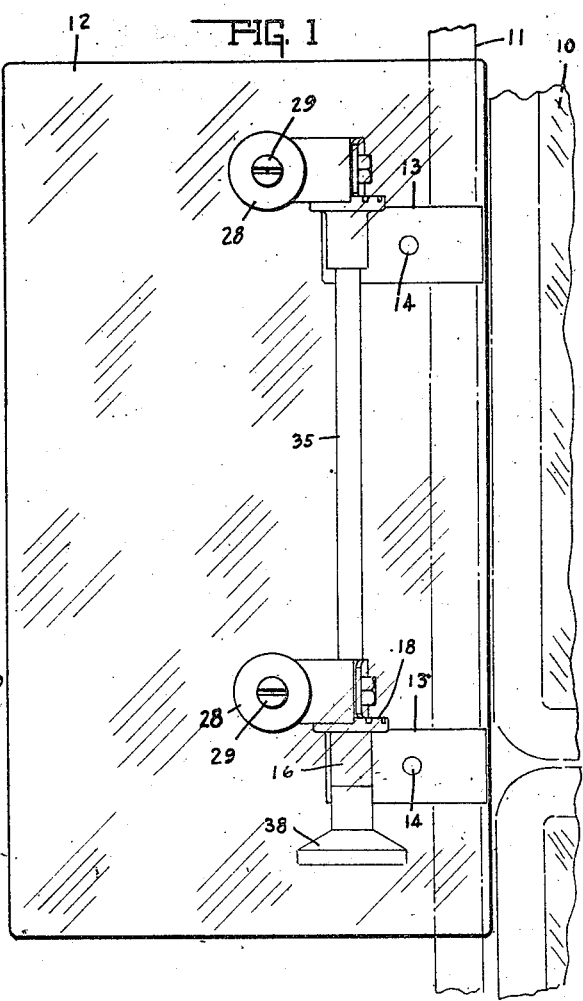
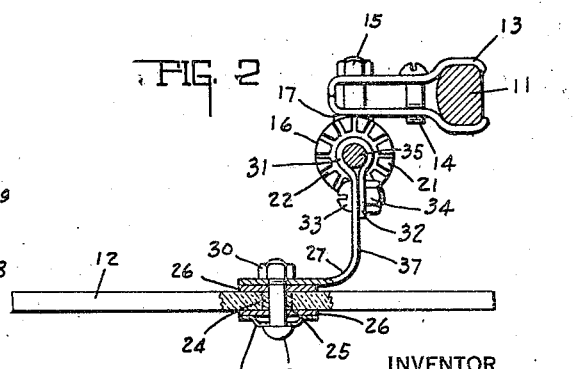
INVENTOR
BURTT J. HUBBARD.
BY
ATTORNEYS.

UNITED STATES PATENT OFFICE.

BURTT J. HUBBARD, OF KOKOMO, INDIANA.

WINDSHIELD-WING.

1,380,909.  Specification of Letters Patent.  Patented June 7, 1921.

Application filed February 14, 1920. Serial No. 358,798.

*To all whom it may concern:*

Be it known that I, BURTT J. HUBBARD, a citizen of the United States, and a resident of Kokomo, county of Howard, and State of Indiana, have invented a certain new and useful Windshield-Wing; and I do hereby declare that the following is a full, clear, and exact description thereof, reference being had to the accompanying drawings, in which like numerals refer to like parts.

The chief object of this invention is to provide a wind shield wing for motor vehicles and the like and positively lock the same to the wind shield of a motor vehicle or the vehicle itself by improved means, so that the wind cannot move the wing shield from the locked position.

Another object of the invention is to provide improved means for locking the wing shield in any one of a number of adjustable positions.

One feature of the invention is in providing a locking bracket formed to receive the wing support in any one of a number of positions and secure the same non-rotatably therein.

A further feature of the invention is in providing the wing shield with a plurality of supports and a hinge rod to which the same are secured and pivotally supporting said hinge rod by a plurality of supports to the motor vehicle or the wind shield thereon.

The full nature of the invention will be understood from the accompanying drawings and the following description and claims.

In the drawings, which are made a part of this application, Figure 1 is an elevational view of the wing shield of a motor vehicle and the means securing the former to the latter. Fig. 2 is a plan view of the same. Fig. 3 is a side elevational view of the wing shield and the improved supporting means and hinge. Fig. 4 is an enlarged detail view of the adjusting and locking locating bracket.

In the drawings 10 indicates the wind shield of a motor vehicle and the like, the same supported by the usual frame rod 11 secured to the chassis of the motor vehicle; 12 indicates a rectangular wing shield or deflector plate, preferably formed of a transparent material, such as glass or the like. Heretofore wing shields have been provided upon motor vehicles and the like, but the same did not permit of universal adjustment and positively locking the same in the adjusted position.

The means for securing the locking hinge to the frame rod 11 comprises a pair of bracket members 13, said members gripping said rod through the medium of a clamping bolt 14. Upon the other end of said clamping members and secured thereto by means of a bolt 15 is the locating and locking bracket member 16. Said locking bracket member comprises a body portion 17, the same being adapted to receive the bolt 15 and abut one of the clamping brackets 13. Positioned upon the upper end of said body portion 17 and integral therewith is a circular supporting flange 18 and extending centrally through said flange and through said body portion is a circular opening 19. Said circular flange, however, is cut away at 20 to form a raised circular ridge or boss 21. Said circular ridge 21 is provided with radially extending slots 22 upon the upper face thereof.

The wing shield 12 is provided with a plurality of holes 24 in spaced relation with each other, said holes are herein shown positioned upon the median line of said wing shield, but may be otherwise positioned if desired. Positioned within the hole 24 is a suitable bushing 25 and surrounding the opening 24 and adjacent said bushing upon each side of the wing shield is positioned a suitable washer 26. A supporting arm 27 lies adjacent one of said washers upon the side of the wind shield and a spring washer 28 lies adjacent the opposite washer 26. Extending through said spring member, washers, bushing and supporting arm is a bolt 29 secured by a nut 30. The opposite end of the supporting arm 27 is bent angularly with respect to the end secured to the wing shield, and at the end of said angular portion 37 the same is bent to form a circular portion 31; the extreme end 32 thereof being turned back upon the angular portion 37 and secured thereto by means of the bolt 33 and nut 34.

A hinge rod 35 extends parallel to the frame rod 11 and is adapted to extend through the openings 19 and be alined thereby. The hinge rod is non-rotatably secured in the circular portion 31 of the supporting arm 27 by suitable pin means 36 extending transversely of said rod and through said circular portion assisted by the clamping bolt 33 and nut 34.

From the foregoing it will be understood that the supporting arms 27 are rigidly secured to the hinge rod 35, the other end of said arms being rigidly secured to the wing shield. The hinge rod 35, as previously stated, is alined in the openings 19 of the locating bracket 16. As shown clearly in Fig. 3 the free end 32 of the supporting arm 27 is cut away so that the angular portion 37 thereof presents a single edge which is adapted to lie in one of the radial slots 22. The locating bracket 16 is adjusted on the frame rod 11 so that the edge of the angular portion 37 may be secured in any one of said slots 22. In the drawings there is shown a plurality of supporting brackets secured to the wing shield and a similar number of locating brackets secured to the wind shield. The position of the hinge rod supporting brackets is adjusted upon the frame rod 11, so that the edge of the supporting angular portion 37 will engage in the slots 22. The hinge rod 35 extends through the lower bracket 16 and upon the threaded end thereof is positioned a clamping nut 38, said nut being held thereon by means of a suitable pin 39. When the nut 38 is turned to permit said rod to have longitudinal movement with respect to the registering openings 19 and the alined brackets 16, the slot engaging edges of the arms 37 may be removed from the slots and positioned in adjacent registering slots. The nut 38 may then be turned to secure said edges in the respective registering slots and in this manner the wing shield will be positively locked so that the force of the wind upon said shield will not move or rotate the same from the adjusted position.

While the invention has been described in great detail, it will be understood that the broader features thereof are not to be limited thereby, as many modifications thereof will suggest themselves to those skilled in the art.

The invention claimed is:

1. In a wind shield the combination with a supporting member and a wing shield, of an elongated hinge rod, a plurality of brackets secured to said shield and supported upon said rod, and a plurality of brackets secured to said vehicle supporting member and supporting said rod, each of said brackets being provided with a plurality of radially extending and registering slots upon a bearing surface transversely of the hinged rod, the adjacent bracket surfaces including a tongue portion, and a single means associated with said rod to seat the bracket tongues and unseat the same in the registering radial slots.

2. In a wind shield the combination with a supporting member and a wing shield, of an elongated hinge rod, a plurality of brackets secured to said shield and supported upon said rod, and a plurality of brackets secured to said supporting member and supporting said rod, one of said sets of brackets being secured to said rod and the other set rotatably supporting the same, one of said sets of brackets being provided with a plurality of radially extending and registering slots upon a bearing surface transversely of the hinged rod, the adjacent bracket surfaces including a tongue portion, and a single means associated with said rod to seat the bracket tongues and unseat the same in the registering radial slots.

3. In an adjustable wind shield the combination with a supporting member and a wing shield of a single elongated hinge member, a plurality of brackets secured to said wing shield and to said elongated hinge member, another bracket secured to said supporting member and rotatably supporting said hinge member, said last mentioned bracket being positioned beneath one of said first mentioned brackets, one of said coöperating brackets having a tongue portion and the other having a plurality of radial grooves to provide a tongue and groove connection therebetween and threaded means associated with a threaded portion of the hinge member adjacent said rotatable supporting bracket member to draw the coöperating bracket members together and rigidly secure the wing to the supported member in the adjusted position.

In witness whereof, I have hereunto affixed my signature.

BURTT J. HUBBARD.